Sept. 25, 1956     S. O. JONES     2,764,669
WELDING ELECTRODE HOLDERS

Filed Nov. 20, 1953     2 Sheets-Sheet 1

INVENTOR
Samuel O. Jones
BY
ATTORNEYS

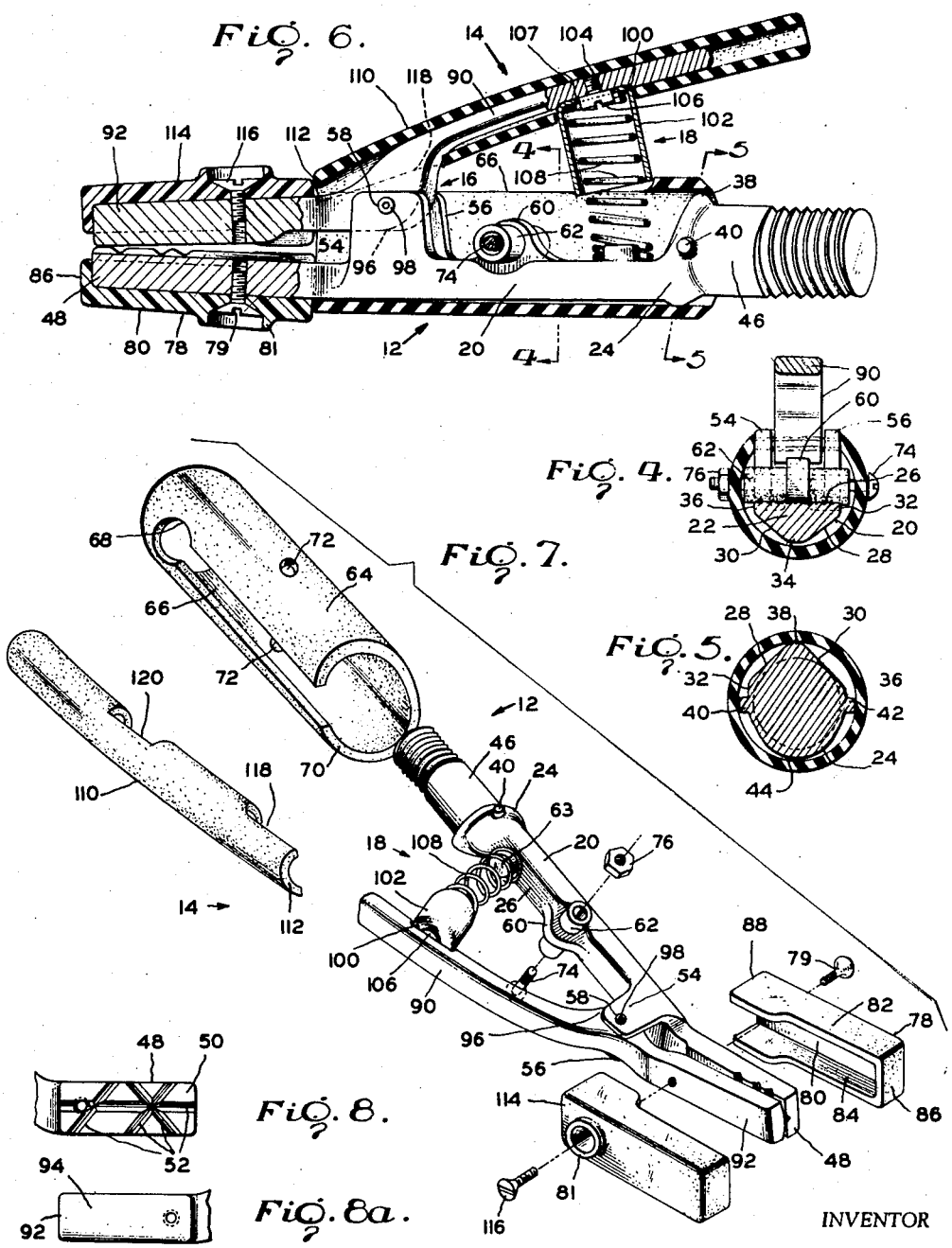

United States Patent Office 2,764,669
Patented Sept. 25, 1956

2,764,669

WELDING ELECTRODE HOLDERS

Samuel O. Jones, Newport News, Va., assignor to Newport News Shipbuilding and Dry Dock Company, Newport News, Va., a corporation of Virginia Application November 20, 1953, Serial No. 393,294

10 Claims. (Cl. 219—138)

The present invention relates to improvements in welding electrode holders and has for its primary object to provide a simplified arrangement of component parts whereby complete insulation is afforded and yet wherein the steps involved in the assembly of the component parts are minimized and easily effected.

A further object of the present invention is to provide an improved welding rod holder wherein the cooperative clamping jaws are so angularly disposed relative to the handle portions as to afford substantial freedom of manipulation of an electrode held between the jaws.

A still further object of the present invention is to provide an improved electrode holder wherein insulative protection of the jaws is provided and which insulative protection is also shock proof, water repellant and heat resistant.

Another object of the present invention is to provide an improved electrode holder including a pair of handle elements terminating in jaws, with insulating sleeve means which require a minimum of securement means for retention of the sleeve means on the handle elements, the spring means which normally functions to urge the jaws together additionally functioning as a retention means for at least one of said sleeve means.

Other objects are to provide an electrode holder which will be relatively light weight and cool to handle and which will be economical of manufacture.

Various other objects and advantages will become apparent from the detailed description to follow.

Generally speaking, my invention is comprised of a pair of handle elements terminating in opposed electrode clamping jaws, with spring means normally urging the jaws together. The jaws are substantially encased in a plastic which is shock proof, water repellant and heat resistant and the handle portions down to the jaws are substantially encased in insulating sleeves. One of the handle elements is adapted to be connected to a source of electrical power and has its insulating sleeve provided with a cut-away portion opposing the other handle element. A bolt passing through the last mentioned insulating sleeve and an insulating tube engaged through an apertured flange on the one handle element, acts to retain that sleeve in position. The cup and spring of the spring means are seated against the other handle element and are held from movement relative thereto and serve to hold the insulating sleeve on that other handle element in place.

In the drawings:

Fig. 4 is a sectional view taken substantially along the plane of line 4—4 of Fig. 6;

Fig. 5 is a sectional view taken substantially along the plane of line 5—5 of Fig. 6;

Fig. 6 is a partial sectional view taken substantially along the plane of line 6—6 of Fig. 2;

Fig. 7 is an exploded perspective view of the holder;

Fig. 8 is a view of the inside face of one of the jaws; and

Fig. 8(a) is a view of the inside face of the other of the jaws.

Figure 1:
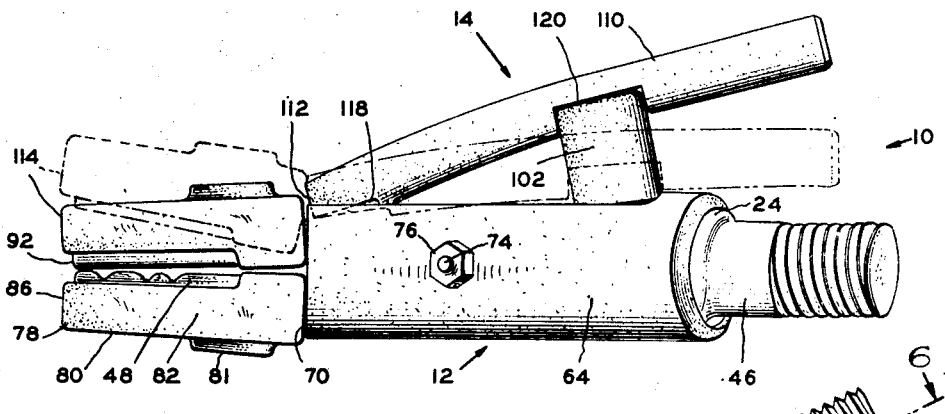
Fig. 1 is a top plan view of the electrode holder of the present invention.

Referring more particularly to the drawings it will be seen that the electrode holder 10 of the present invention is comprised of a pair of handle elements 12 and 14, means 16 for interconnecting the handle elements 12 and 14 and spring means 18 between the handle elements.

The handle element 12 is comprised of an electrically conductive handle portion 20 of small cross-sectional area as at 22 throughout most of its length and having an enlarged portion at 24. As shown in Fig. 4, the handle portion 20 has a flat inner surface 26, beveled surfaces 28 and 30, and with the corner portions of the substantially triangularly shaped cross-section being flattened as at 32, 34 and 36. The enlarged portion 24, as shown in Fig. 5, has the beveled surfaces 28 and 30 merging at the apex 38 and the flat surfaces 32 and 36 have aligned projections 40 and 42 integral therewith. The flat surfaces 32 and 36 curve inwardly and downwardly toward each other and an arcuate surface 44 joins the same at their lower edges.

On the side of the enlargement 24 opposite to the reduced cross-sectional area portion, the handle portion has another reduced portion 46 of circular cross-section and externally threaded so as to be adapted to have an electrical cable connected thereto.

The handle portion 20 terminates at its opposing end in a jaw 48 of flattened rectangular cross-section. The jaw may be disposed at an angle of from 90° to 180° relative to the handle portion, the particular angle shown in Fig. 2 being particularly desirable. As seen best in Fig. 8, the jaw 48 has its inner face 50 formed with crossed grooves 52 so as to have engagement with an electrode for holding it in any of a plurality of angular relationships.

The intermediate portion 22 has wormed integrally therewith adjacent the jaw 48 a pair of parallel spaced flanges 54 and 56 which extend inwardly from the flattened side edges 32 and 36. The flanges 54 and 56 have aligned apertures 58 therein.

Between the flanges 54 and 56 and the enlarged portion 24, and extending inwardly from the flat face 26 is an aperture flange 60, as shown in Figs. 6 and 7. An insulating heat resistant tube 62 is snugly received through the apertured flange 60. Between the flange 60 and portion 24 a boss 63 is formed on the face 26 to provide a retainer means.

Figure 2:
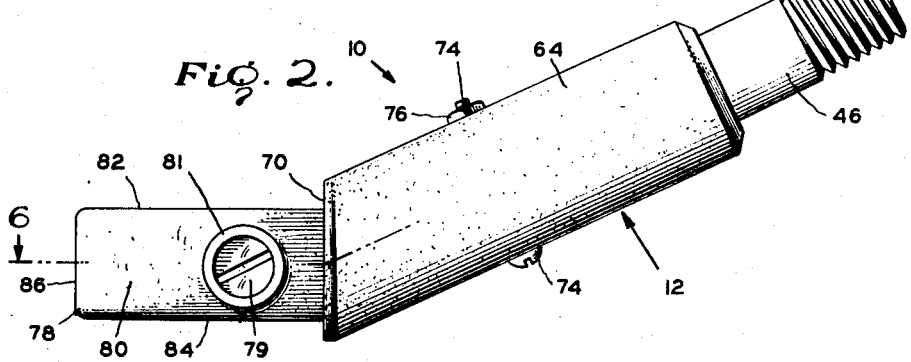
Fig. 2 is a side elevational view of the holder of Fig. 1.
Figure 3:
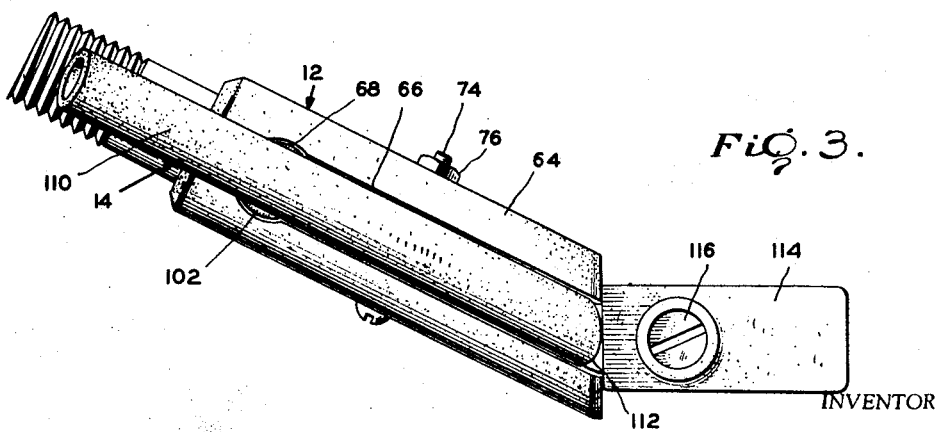
Fig. 3 is a side elevational view of the side opposite to that shown in Fig. 2.

A sleeve-like insulating member 64 of substantially cylindrical open-ended form is engaged over the handle portion 20 and is of such interior dimensions as to slidably engage the surfaces at the apex 38, the projections 40 and 42 and at 44 so as to be spaced from contact with the conductive handle portion 20 for ventilation and cooling purposes. The member 64 has a longitudinally extending cut-away portion 66 terminating at one end in the circular opening 68 and opening out at end edge 70, which latter edge is beveled as best shown in Figs. 2 and 3.

Approximately medially of its ends and about 90° removed from the cut-away at 66, the sleeve-like member 64 has a pair of aligned openings 72 and when the member 64 is in encasing relation to the handle portion 20, the tube 62 is aligned with the openings 72 and a bolt 74 is passed therethrough and a nut 76 on the bolt secures the member 64 in position.

The jaw 48 has a molded plastic insulating cap 78 over its back, and secured by screw 79, the head of which is deep in the recessed boss 81. The boss 81 is provided so as to increase the transverse cross-sectional area of each cap at the aperture for the screws 79 and 116 to be substantially equal to the transverse cross-sectional area throughout the length of each cap so as to maintain the strength of the caps and thus minimize the possibility of fracture of the caps. The plastic has the properties of being shock-proof, water-repellant and heat resistant. The cap 78 is of channel shape including flat wall 80, side walls 82, 84 and an end wall 86, the side and end walls 82, 84 and 86 being of such height as to leave exposed the necessary portion of the jaw 48, see Fig. 1. The end edge 88 of the cap 78 has the beveled end edge 70 of the sleeve-like member 64 contacted thereagainst.

The other handle element 14 is somewhat shorter than the above described element and is of substantially uniform cross-sectional area throughout its handle portion 90 and slightly longitudinally arcuated. The handle element 14 terminates in an angularly disposed jaw 92 substantially similar in form and angular relationship to jaw 48 and opposing the latter. As shown in Fig. 8(a), the inside face 94 of jaw 92 has a smooth, slightly convex surface for clamping an electrode in a groove 52 of the opposing jaw 48.

Between the handle portion 90 and jaw 92, an apertured offset portion 96 is provided for cooperative engagement between the flanges 54 and 56 of the one handle element 12. Means 16 in the form of a hollow rivet or pin 98 is engaged through the aligned apertures and thereby pivotally interconnects the handle elements.

At the portion of the handle element 14 opposing the boss 68, a recess 100 is provided in which an insulating cup 102 is seated. A screw 104 is secured to the handle portion and its head 106 seats within an opening 107 at the bottom of the cup to retain the latter from sliding relative to the handle portion. A spring 108 is engaged in the cup 102 and encircles the retainer boss 63 so as to urge the handle portions apart and the jaws together. The cup 102 is of such a diameter as to closely cooperate with the opening at 68 in the sleeve-like member 64.

An insulating sleeve-like members 110 is engaged over handle portion 90 and has its end surface beveled at 112 for close cooperation with the cap 114 which is secured to jaw 92 by screw 116, the formation and material of the cap 114 being similar to cap 78, above described. The member 110 is cut-away at 118 to provide for the pivotal interconnecting flanges 54 and 56 and is also cutaway at 120 to provide for the cup 102.

In assembly, the caps 78 and 114 are secured over their respective jaws 48 and 92 by screws and sleeve-like member 110 is engaged over handle portion 90. The spring means 18 including cup 102 and spring 108 are placed in position and sleeve 64 is engaged over handle element 20 and secured by bolt 74 and nut 76 as above described. Thus the bolt 74 and nut 76 along with the spring means 18 serve to retain the two sleeve-like members on their handle portions. The assembled holder is thus well insulated for handling yet is cool because of the substantial open spaces within the sleeve-like members and open to atmosphere. The angularity of the jaws provides for greater facility in using the holder in otherwise difficult jobs and the caps on the jaws protect the same from damage and also avoid the possibility of the jaws being accidentally grounded while in use.

It is to be particularly noted that the arrangement disclosed is easily disassembled for replacement of any of its parts should that be necessary. Also by the utilization of a minimum number of securement elements the maximum speed of assembly and disassembly is made possible.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. An electrode holder comprising, a first handle element, said handle element including an elongate intermediate portion, a jaw at its forward end, an upstanding enlarged portion at its rearward end, and a pair of spaced, upstanding flanges on the intermediate portion adjacent said jaw, a second handle element, said second handle element including an elongate handle portion overlying the intermediate portion of the first handle element, a forward end presenting a jaw, and an offset portion joining said elongate handle portion and the last mentioned jaw, said offset portion being disposed between said upstanding flanges of the first handle element, means pivotally interconnecting said flanges and said offset portion, a generally cylindrical insulating sleeve embracing a portion of said first handle element, said sleeve having a longitudinal slot extending from its forward end and terminating adjacent its rearward end, said slot presenting, at the forward end of the sleeve, spaced edge portions snugly engaging the outer surfaces of said upstanding flanges at the upper free ends of the same, the rearward end of the sleeve beyond the terminus of said slot snugly embracing said upstanding enlarged portion of the first handle element, a cup element having its closed end anchored to said elongate handle portion of the second handle element and projecting therefrom into the confines of said sleeve through said slot, a spring housed within said cup element and seated upon said intermediate portion of the first handle element to normally urge said jaws together, means securing said sleeve to the first handle element, and insulating means enclosing said handle portion of the second handle element.

2. An electrode holder comprising, a first handle element, said handle element including an elongate intermediate portion, a jaw at its forward end, an upstanding enlarged portion at its rearward end, and a pair of spaced, upstanding flanges on the intermediate portion adjacent said jaw, a second handle element, said second handle element including an elongate handle portion overlying the intermediate portion of the first handle element, a forward end presenting a jaw, and an offset portion joining said elongate handle portion and the last mentioned jaw, said offset portion being disposed between said upstanding flanges of the first handle element, means pivotally interconnecting said flanges and said offset portion, a generally cylindrical insulating sleeve embracing a portion of said first handle element, said sleeve having a longitudinal slot extending from its forward end and terminating adjacent its rearward end, said slot presenting, at the forward end of the sleeve, spaced edge portions snugly engaging the outer surfaces of said upstanding flanges at the upper free ends of the same, the rearward end of the sleeve beyond the terminus of said slot snugly embracing said upstanding enlarged portion of the first handle element, a cup element having its closed end anchored to said elongate handle portion of the second handle element and projecting therefrom into the confines of said sleeve through said slot, a spring housed within said cup element and seated upon said intermediate portion of the first handle element to normally urge said jaws together, means securing said sleeve to the first handle element, and insulating means enclosing said handle portion of the second handle element, said intermediate portion and said elongate handle portion lying in a common plane and said jaws being angularly directed from the said plane containing said intermediate portion and said elongate handle portion.

3. An electrode holder comprising, a first handle element, said handle element including an elongate intermediate portion, a jaw at its forward end, an upstanding enlarged portion at its rearward end, and a pair of spaced, upstanding flanges on the intermediate portion adjacent said jaw, a second handle element, said second handle element including an elongate handle portion overlying the intermediate portion of the first handle element, a forward end presenting a jaw, and an offset portion joining said elongate handle portion and the last mentioned jaw, said offset portion being disposed between said upstanding flanges of the first handle element, means pivotally interconnecting said flanges and said offset portion, a generally cylindrical insulating sleeve embracing a portion of said first handle element, said sleeve having a longitudinal slot extending from its forward end and terminating adjacent its rearward end, said slot presenting, at the forward end of the sleeve, spaced edge portions snugly engaging the outer surfaces of said upstanding flanges at the upper free ends of the same, the rearward end of the sleeve beyond the terminus of said slot snugly embracing said upstanding enlarged portion of the first handle element, a second insulating sleeve embracing said elongate handle portion of the second handle element, said second sleeve having an opening intermediate its ends, a cup element having its closed end projecting through said opening and anchored against said elongate handle portion, said cup projecting from said elongate handle portion through the slot in the first sleeve, a spring housed within said cup element and seated upon said intermediate portion of the first handle element to normally urge said jaws together.

4. An electrode holder comprising, a first handle element, said handle element including an elongate intermediate portion, a jaw at its forward end, an upstanding enlarged portion at its rearward end, and a pair of spaced, upstanding flanges on the intermediate portion adjacent said jaw, a second handle element, said second handle element including an elongate handle portion overlying the intermediate portion of the first handle element, a forward end presenting a jaw, and an offset portion joining said elongate handle portion and the last mentioned jaw, said offset portion being disposed between said upstanding flanges of the first handle element, means pivotally interconnecting said flanges and said offset portion, a generally cylindrical insulating sleeve embracing a portion of said first handle element, said sleeve having a longitudinal slot extending from its forward end and terminating adjacent its rearward end, said slot presenting, at the forward end of the sleeve, spaced edge portions snugly engaging the outer surfaces of said upstanding flanges at the upper free ends of the same, the rearward end of the sleeve beyond the terminus of said slot snugly embracing said upstanding enlarged portion of the first handle element, a second insulating sleeve embracing said elongate handle portion of the second handle element, said second sleeve having an opening intermediate its ends, a cup element having its closed end projecting through said opening and anchored against said elongate handle portion, said cup projecting from said elongate handle portion through the slot in the first sleeve, a spring housed within said cup element and seated upon said intermediate portion of the first handle element to normally urge said jaws together, said intermediate portion and said elongate handle portion lying in a common plane and said jaws being angularly directed from the said plane containing said intermediate portion and said elongate handle portion.

5. An electrode holder comprising, a first handle element, said handle element including an elongate intermediate portion, a jaw at its forward end, an upstanding enlarged portion at its rearward end, an upstanding enlarged portion at its rearward end, and a pair of spaced, upstanding flanges on the intermediate portion adjacent said jaw, a second handle element, said second handle element including an elongate handle portion overlying the intermediate portion of the first handle element, a forward end presenting a jaw, and an offset portion joining said elongate handle portion and the last mentioned jaw, said offset portion being disposed between said upstanding flanges of the first handle element, means pivotally interconnecting said flanges and said offset portion, a generally cylindrical insulating sleeve embracing a portion of said first handle element, said sleeve having a longitudinal slot extending from its forward end and terminating adjacent its rearward end, said slot presenting, at the forward end of the sleeve, spaced edge portions snugly engaging the outer surfaces of said upstanding flanges at the upper free ends of the same, the rearward end of the sleeve beyond the terminus of said slot snugly embracing said upstanding enlarged portion of the first handle element, an apertured upstanding lug formed on said intermediate portion of the first handle element, a tube projecting through said lug and terminating at its opposite ends closely adjacent opposed inner surfaces of said sleeve, said sleeve having opposed apertures therein registering with said tube, a fastener extending through said tube and said sleeve securing the sleeve to said first handle element, a cup element having its closed end anchored to said elongate handle portion of the second handle element and projecting therefrom into the confines of said sleeve through said slot, a spring housed within said cup element and seated upon said intermediate portion of the first handle element to normally urge said jaws together.

6. An electrode holder comprising, a first handle element, said handle element including an elongate intermediate portion, a jaw at its forward end, an upstanding enlarged portion at its rearward end, and a pair of spaced, upstanding flanges on the intermediate portion adjacent said jaw, a second handle element, said second handle element including an elongate handle portion overlying the intermediate portion of the first handle element, a forward end presenting a jaw, and an offset portion joining said elongate handle portion and the last mentioned jaw, said offset portion being disposed between said upstanding flanges of the first handle element, means pivotally interconnecting said flanges and said offset portion, a generally cylindrical insulating sleeve embracing a portion of said first handle element, said sleeve having a longitudinal slot extending from its forward end and terminating adjacent its rearward end, said slot presenting, at the forward end of the sleeve, spaced edge portions snugly engaging the outer surfaces of said upstanding flanges at the upper free ends of the same, the rearward end of the sleeve beyond the terminus of said slot snugly embracing said upstanding enlarged portion of the first handle element, a cup element having its closed end anchored to said elongate handle portion of the second handle element and projecting therefrom into the confines of said sleeve through said slot, a spring housed within said cup element and seated upon said intermediate portion of the first handle element to normally urge said jaws together, means securing said sleeve to the first handle element, and insulating means enclosing said handle portion of the second handle element, said slot being enlarged at its inner end and the cup element being projected through the slot enlargement in close proximity to the portion of the sleeve defining the enlarged portion of the slot, whereby the cup element and sleeve interlock to prevent relative longitudinal movement between the sleeve and the first handle element.

7. An electrode holder comprising a first handle element, said handle element including an elongate intermediate portion, a jaw at its forward end, a second handle element, said second handle element including an elongate handle portion overlying the intermediate portion of the first handle element, a forward end presenting a jaw and an offset portion joining said elongate handle portion and the last mentioned jaw, a pivot coupling between said offset portion and said intermediate portion adjacent to said first jaw, an insulating sleeve-like member embracing a major portion of the length of said first handle element and terminating at its forward end at the rear end of the first jaw, the sleeve-like member having a longitudinal opening along the side facing the second handle element, said opening at the forward end of the sleeve-like member receiving said pivot coupling whereby the forward end of the sleeve-like member shields the coupling, a cup element having its closed end anchored to said elongate handle portion and extending therefrom into the said sleeve-like member through said opening, a spring housed within said cup element and seated upon said intermediate portion of the first handle element to normally urge said jaws together, means securing said sleeve-like member to the first handle element, and insulating means encasing said handle portion of the second handle element and terminating at its forward end in close proximity to the rear end of the second mentioned jaw and partially within the forward end portion of said opening.

8. An electrode holder comprising a first handle element, said handle element including an elongate intermediate portion, a jaw at its forward end, a second handle element, said second handle element including an elongate handle portion overlying the intermediate portion of the first handle element, a forward end presenting a jaw and an offset portion joining said elongate handle portion and the last mentioned jaw, a pivot coupling between said offset portion and said intermediate portion adjacent to said first jaw, an insulating sleeve-like member embracing a major portion of the length of said first handle element and terminating at its forward end at the rear end of the first jaw, the sleeve-like member having a longitudinal opening facing the second handle element, said opening at the forward end of the sleeve-like member receiving said pivot coupling whereby the forward end of the sleeve-like member shields the coupling, a cup element having its closed end anchored to said elongate handle portion and extending therefrom into the said sleeve-like member through said opening, a spring housed within said cup element and seated upon said intermediate portion of the first handle element to normally urge said jaws together, means securing said sleeve to the first handle element, and insulating means encasing said handle portion of the second handle element and terminating at its forward end in close proximity to the rear end of the second mentioned jaw and partially within the forward end portion of said opening, the said intermediate portion of the first handle element and said elongate handle portion lying in a common plane, and said jaws being directed laterally from the said plane containing the intermediate and elongate handle portions.

9. An electrode holder comprising a first handle element, said handle element including an elongate intermediate portion, a jaw at its forward end, a second handle element, said second handle element including an elongate handle portion overlying the intermediate portion of the first handle element, a forward end presenting a jaw and an offset portion joining said elongate handle portion and the last mentioned jaw, a pivot coupling between said offset portion and said intermediate portion adjacent to said first jaw, insulating means encasing said intermediate portion, insulating means encasing said handle portion and the offset of the second handle element, the first mentioned insulating means covering and totally shielding the pivot coupling and the second mentioned insulating means being partially extended into the first mentioned insulating means immediately adjacent to the rearward end of the second mentioned jaw, an expansion spring interposed between said intermediate portion and said elongate handle portion and functioning to urge said jaws together, insulating means enclosing said spring between the insulating means for said intermediate portion and the said handle portion, the said intermediate portion and said handle portion lying in a common plane, and said jaws being angularly directed from the said common plane containing the intermediate and the elongate handle portions.

10. An electrode holder comprising a first handle element, said handle element including an elongate intermediate portion, a jaw at its forward end, a second handle element, said second handle element including an elongate handle portion overlying the intermediate portion of the first handle element, a forward end presenting a jaw and an offset portion joining said elongate handle portion and the last mentioned jaw, a pivot coupling between said offset portion and said intermediate portion adjacent to said first jaw, insulating means encasing said intermediate portion, insulating means encasing said handle portion and the offset of the second handle element, the first mentioned insulating means covering and totally shielding the pivot coupling and the second mentioned insulating means being partially extended into the first mentioned insulating means immediately adjacent to the rearward end of the second mentioned jaw, an expansion spring interposed between said intermediate portion and said elongate handle portion and functioning to urge said jaws together, insulating means enclosing said spring between the insulating means for said intermediate portion and the said handle portion, the said intermediate portion and said handle portion lying in a common plane, and said jaws being angularly directed from the said common plane containing the intermediate and the elongate handle portions, and insulating means covering the entire surface of the back of each of said jaws and the major part of each side thereof through the full length of the same up to the insulating means on the part of the handle element to which it is joined whereby the jaw carried insulating means and the insulating means covering the part of the handle element of which the jaw forms a part are substantially continuous.

References Cited in the file of this patent

UNITED STATES PATENTS

| | | |
|---|---|---|
| 2,089,688 | Clark | Aug. 10, 1937 |
| 2,213,306 | Del Bene | Sept. 3, 1940 |
| 2,311,022 | Bourque | Feb. 16, 1943 |
| 2,415,671 | Camilleri | Feb. 11, 1947 |
| 2,416,872 | Garibay | Mar. 4, 1947 |
| 2,430,376 | Van Dyke | Nov. 4, 1947 |